United States Patent
Sakaguchi et al.

(10) Patent No.: US 10,756,314 B2
(45) Date of Patent: Aug. 25, 2020

(54) COMPOSITE SHEET AND BATTERY PACK USING SAME

(71) Applicant: Panasonic Intellectual Property Management Co., Ltd., Osaka (JP)

(72) Inventors: Yoshiya Sakaguchi, Kyoto (JP); Norihiro Kawamura, Hokkaido (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 93 days.

(21) Appl. No.: 16/066,705

(22) PCT Filed: Mar. 9, 2017

(86) PCT No.: PCT/JP2017/009416
§ 371 (c)(1),
(2) Date: Jun. 28, 2018

(87) PCT Pub. No.: WO2017/159527
PCT Pub. Date: Sep. 21, 2017

(65) Prior Publication Data
US 2019/0006642 A1 Jan. 3, 2019

(30) Foreign Application Priority Data

Mar. 14, 2016 (JP) ................. 2016-049294

(51) Int. Cl.
*H01M 2/00* (2006.01)
*H01M 2/10* (2006.01)
(Continued)

(52) U.S. Cl.
CPC ....... *H01M 2/1016* (2013.01); *H01M 2/1077* (2013.01); *H01M 10/613* (2015.04);
(Continued)

(58) Field of Classification Search
CPC ............. H01M 2/1016; H01M 10/613; H01M 10/647; H01M 10/651; H01M 10/6551
See application file for complete search history.

(56) References Cited

U.S. PATENT DOCUMENTS 6,517,744 B1 2/2003 Hara et al.
2009/0142628 A1* 6/2009 Okada ................. H01M 2/0237
429/8
(Continued)

FOREIGN PATENT DOCUMENTS

CN 102117945 A * 7/2011
JP 2001-315244 11/2001
(Continued)

OTHER PUBLICATIONS

CN102117945A Espacenet Machine Translation (Year: 2011).*
(Continued)

*Primary Examiner* — Cynthia H Kelly
*Assistant Examiner* — Monique M Wills
(74) *Attorney, Agent, or Firm* — McDermott Will & Emery LLP

(57) ABSTRACT

A composite sheet includes a thermally-conductive sheet, a first insulating sheet that covers one surface of the thermally-conductive sheet; a second insulating sheet that covers another surface of the thermally-conductive sheet, and seals the thermally-conductive sheet between the first insulating sheet and the second insulating sheet, and a thermal insulation layer that is laminated between the thermally-conductive sheet and the first insulating sheet to cover at least a part of the thermally-conductive sheet.

11 Claims, 7 Drawing Sheets

(51) Int. Cl.
- *H01M 10/653* (2014.01)
- *H01M 10/6555* (2014.01)
- *H01M 10/613* (2014.01)
- *H01M 10/658* (2014.01)
- *H01M 10/651* (2014.01)
- *H01M 10/647* (2014.01)
- *H01M 10/6551* (2014.01)

(52) U.S. Cl.
CPC ....... *H01M 10/651* (2015.04); *H01M 10/653* (2015.04); *H01M 10/658* (2015.04); *H01M 10/6555* (2015.04); *H01M 10/647* (2015.04); *H01M 10/6551* (2015.04)

(56) References Cited

U.S. PATENT DOCUMENTS

2012/0298433 A1* 11/2012 Ohkura ............... H01M 2/1077 180/65.1
2015/0349394 A1 12/2015 Hayashida et al.
2016/0016378 A1 1/2016 Oikawa et al.
2017/0194829 A1 7/2017 Sadanaga et al.

FOREIGN PATENT DOCUMENTS

| JP | 2004-081382 | | 3/2004 |
|---|---|---|---|
| JP | 2004081382 A | * | 3/2004 |
| JP | 2015-225765 | | 12/2015 |
| JP | 2016-018813 | | 2/2016 |
| JP | 2016-028880 | | 3/2016 |
| WO | 2016/017164 | | 2/2016 |

OTHER PUBLICATIONS

JP2004-081382A J-PlatPat Machine Translation (Year: 2004).*
International Search Report of PCT application No. PCT/JP2017/009416 dated May 9, 2017.

* cited by examiner

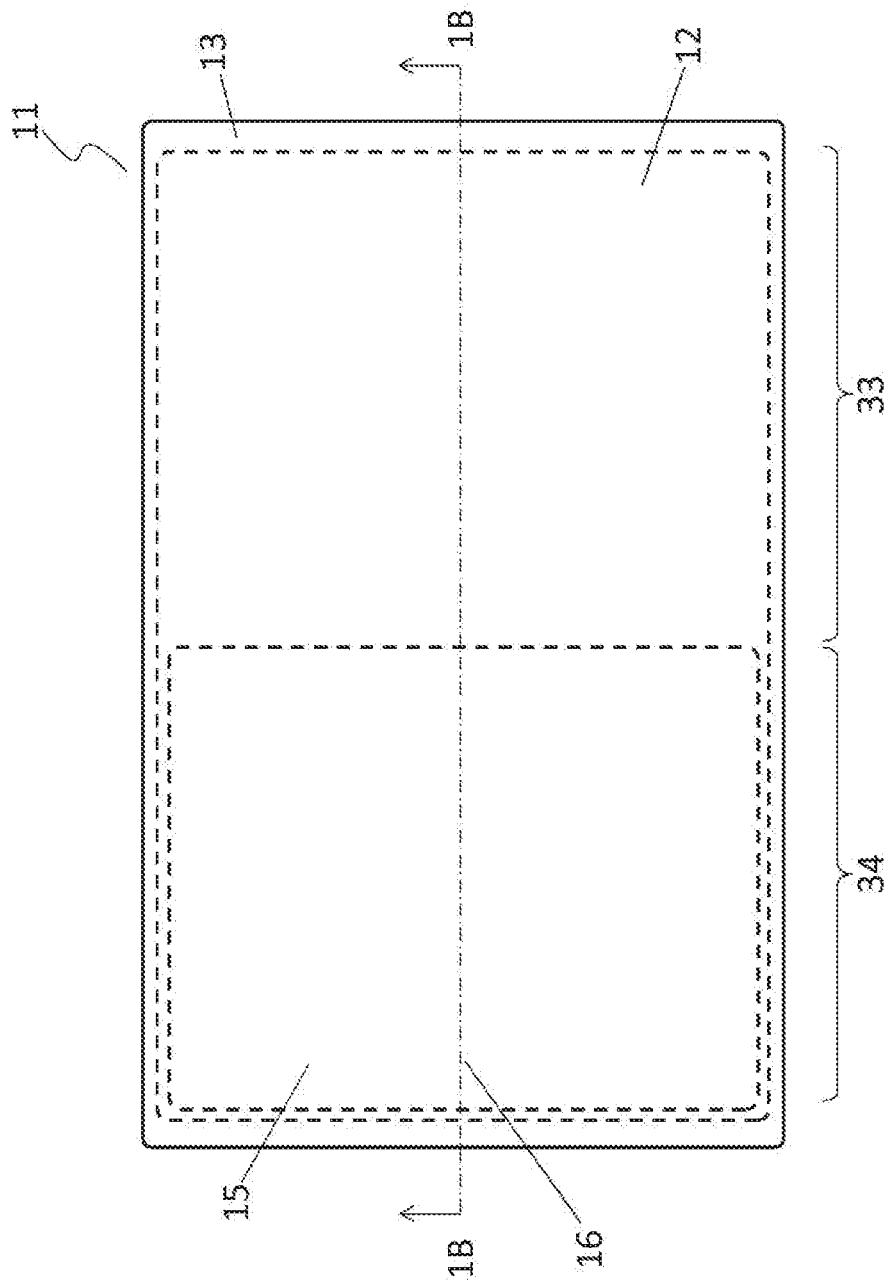

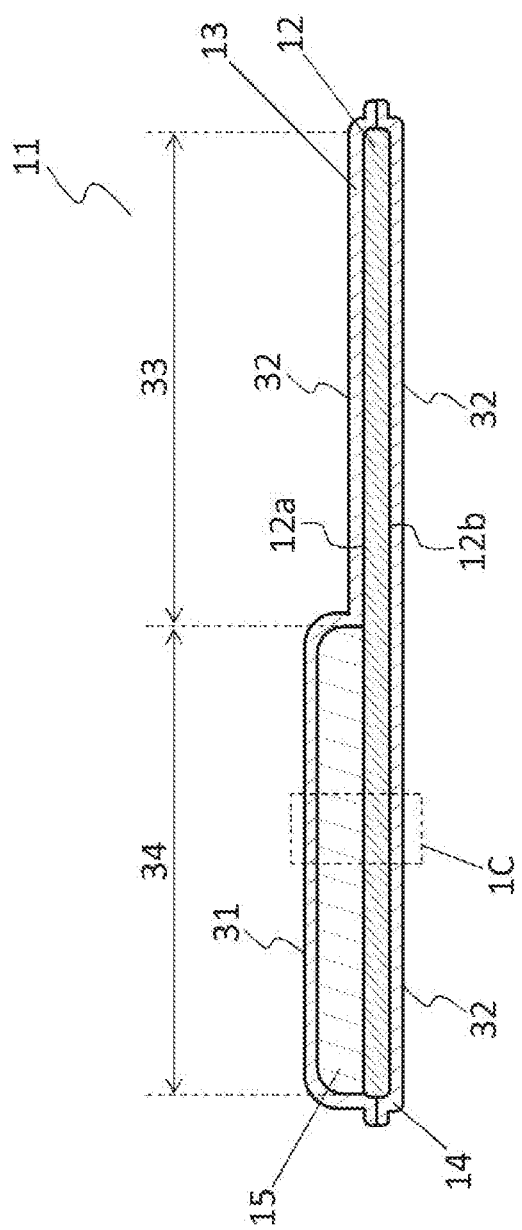

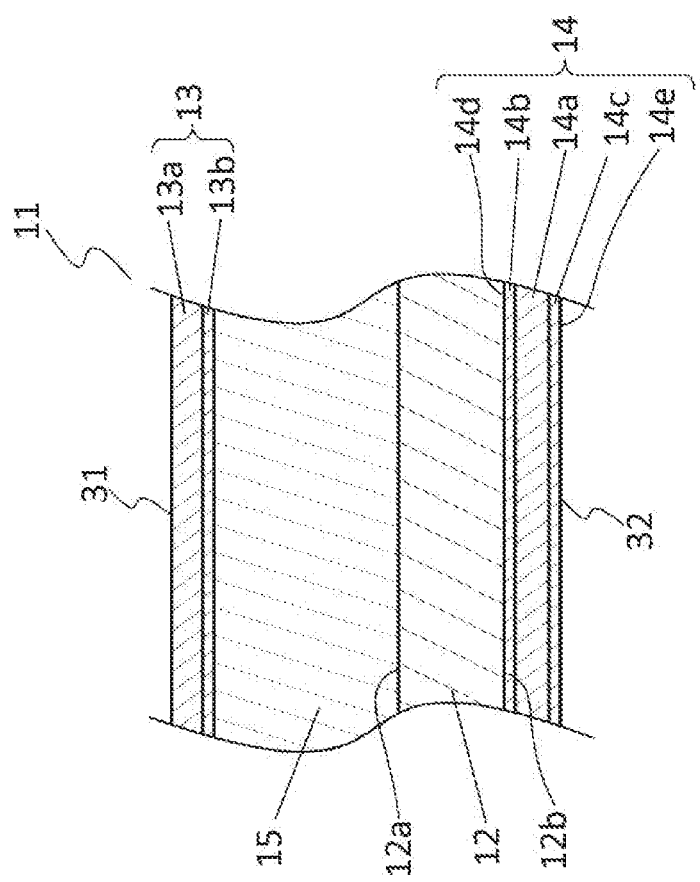

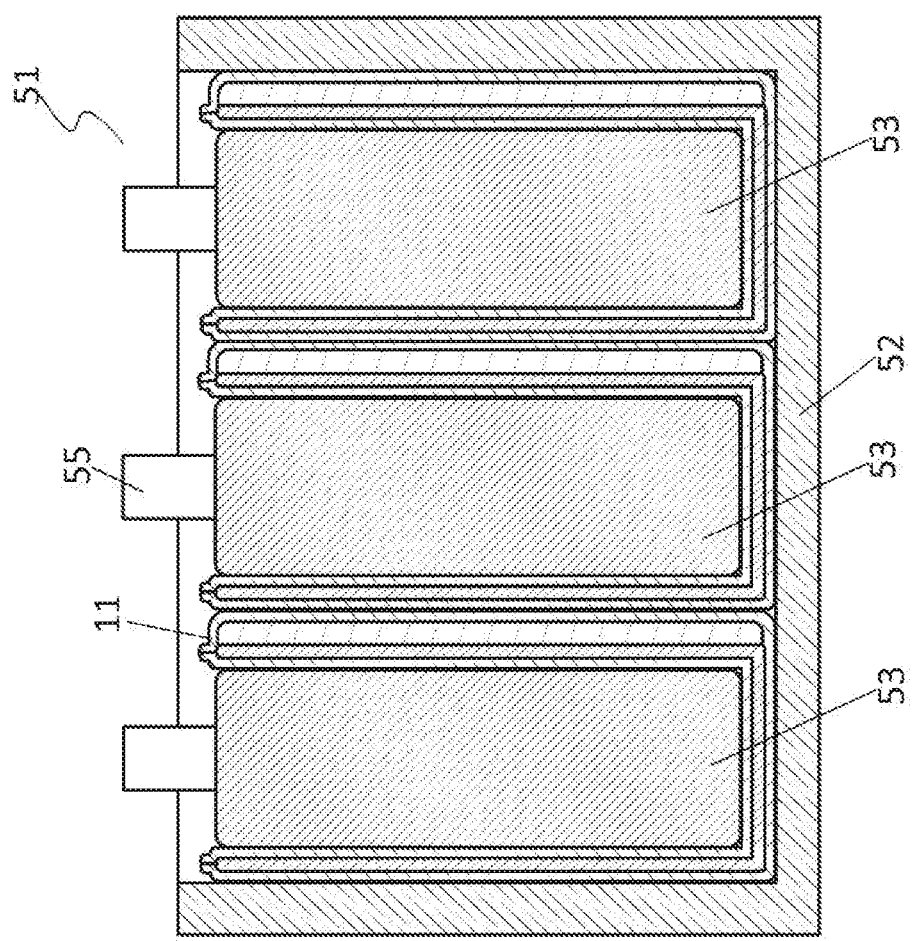

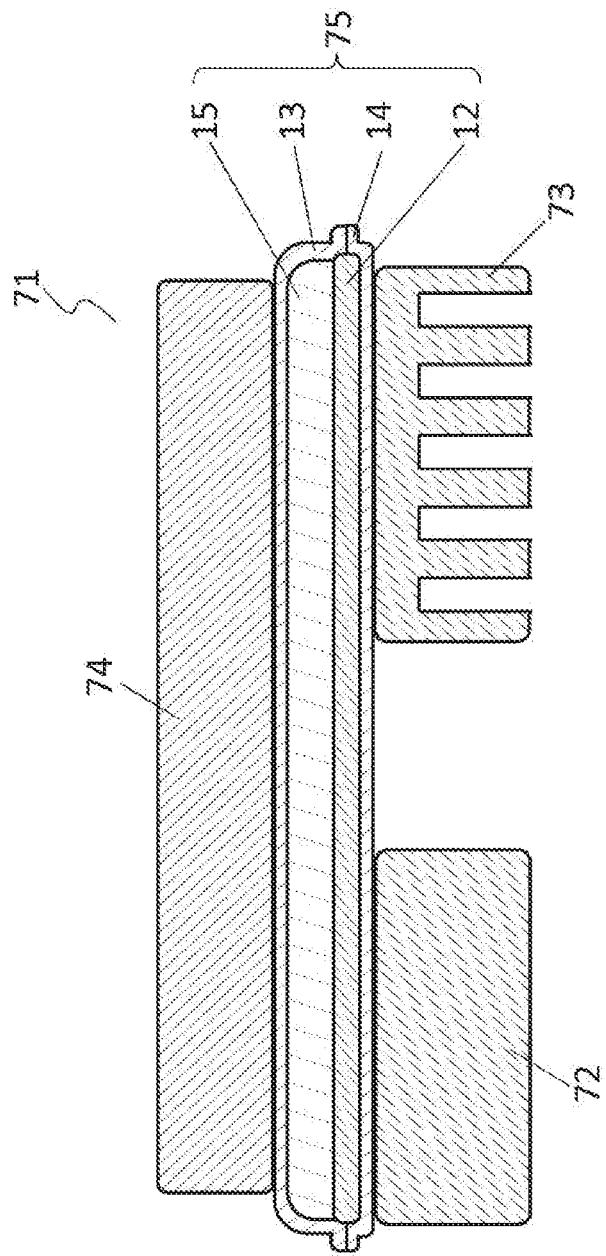

COMPOSITE SHEET AND BATTERY PACK USING SAME

TECHNICAL FIELD

The present disclosure relates to a composite sheet and a battery pack using same.

BACKGROUND ART

With the development in sophistication and size-reduction of electronic equipment, the amount of heat generated by the electronic components used in the electronic equipment has been increasing. To dissipate the generated heat, thermally-conductive members such as the graphite sheets or the like are used.

On the other hand, lithium ion secondary batteries have become equipped in various equipment, and the current capacity of the batteries has been increasing. Increase in current used by use of the large-current capacity lithium ion battery causes increase in the amount of heat generation. To dissipate the generated heat, thermally-conductive members such as the graphite sheets or the like have been used.

A known prior art reference related to the present application is, for example, PTL 1.

CITATION LIST

Patent Literature

PTL 1: Japanese Patent Laid-Open Publication No. 2015-225765

SUMMARY

A composite sheet includes a thermally-conductive sheet, a first insulating sheet that covers one surface of the thermally-conductive sheet, and a second insulating sheet that covers another surface of the thermally-conductive sheet and seals the thermally-conductive sheet between the first insulating sheet and the second insulating sheet. The composite sheet further includes a thermal insulation layer laminated between the thermally-conductive sheet and the first insulating sheet so as to cover at least a part of the thermally-conductive sheet.

This composite sheet has a region which is superior in thermal conduction and a region which is superior in thermal insulation to provide both the performances as a thermally-conductive member and a thermal insulation member.

A battery pack includes a case, a battery cell disposed inside the case, and the composite sheet bonded to an outer surface of the battery cell. The composite sheet is bonded to the battery cell such that the second insulating sheet of the composite sheet contacts the outer surface of the battery cell, and that the thermal insulation layer is disposed between the battery cell to which the composite sheet is bonded and another battery cell adjacent to the battery cell.

This battery pack is superior in heat dissipation from the battery cell to the case as well as superior in thermal insulation between adjacent battery cells, so that the battery pack has a high reliability.

BRIEF DESCRIPTION OF DRAWINGS

FIG. 1A is a plan view of a composite sheet in accordance with an exemplary embodiment.

FIG. 1B is a sectional view of the composite sheet along line 1B-1B shown in FIG. 1A.

FIG. 1C is a sectional view of main part 1C of the composite sheet shown in FIG. 1B.

FIG. 2A is a sectional view of a battery pack including a composite sheet in accordance with the exemplary embodiment.

FIG. 3 is a sectional view of a device in accordance with another exemplary embodiment.

DETAILED DESCRIPTION OF PREFERRED EMBODIMENTS

Figure 2B:
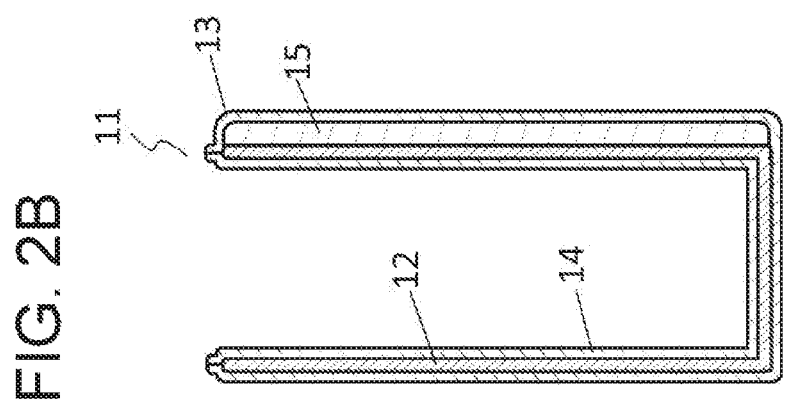
FIG. 2B is a sectional view of the composite sheet of the battery pack shown in FIG. 2A.

Hereinafter, a composite sheet in accordance with an exemplary embodiment will be described with reference to the drawings. FIG. 1A is a plan view of composite sheet 11 in accordance with an exemplary embodiment. FIG. 1B is a sectional view of composite sheet 11 along line 1B-1B shown in FIG. 1A. FIG. 1C is a sectional view of main part 1C of composite sheet 11 shown in FIG. 1B.

Composite sheet 11 has thermally-conductive sheet 12, thermal insulation layer 15, first insulating sheet 13, and second insulating sheet 14. Thermally-conductive sheet 12 has a relatively high thermal conductivity, and thermal insulation layer 15 has a relatively low thermal conductivity. Each of first insulating sheet 13 and second insulating sheet 14 has an electrical insulation property. First insulating sheet 13 covers one surface 12a of thermally-conductive sheet 12. Second insulating sheet 14 covers another surface 12b of thermally-conductive sheet 12. First insulating sheet 13 and second insulating sheet 14 have a larger size than thermally-conductive sheet 12, and are bonded to each other outside the outer periphery of thermally-conductive sheet 12 to seal thermally-conductive sheet 12. Thermal insulation layer 15 is laminated between thermally-conductive sheet 12 and first insulating sheet 13 so as to cover at least a part of thermally-conductive sheet 12. First insulating sheet 13 and second insulating sheet 14 seals thermal insulation layer 15 together with thermally-conductive sheet 12.

Composite sheet 11 has a region which has a high thermal conduction property and a region which has a high thermal insulative property. Accordingly, composite sheet 11 is a single member that possesses both performances of a thermally-conductive member and a thermal insulation member. Composite sheet 11 performs functions of both the thermally-conductive member and the thermal insulation member in a restricted space, particularly in an electronic device having a small size. Accordingly, composite sheet 11 can reduce the size of an electronic device.

A material of thermally-conductive sheet 12 is a graphite sheet having a thickness of about 50 μm. The graphite sheet has high thermal conduction property, and has an in-plane thermal conductivity of about 1300 W/m·K. The graphite sheet has an anisotropic thermal conduction property such that its in-plane thermal conductivity is higher than its through-plane thermal conductivity. The graphite sheet as thermally-conductive sheet 12 is particularly preferable for composite sheet 11 because the thermal conduction property of composite sheet 11 becomes better.

Electrically conductive graphite powder may be produced from the graphite sheet, and that the graphite powder would adhere to an electronic circuit to cause a failure, such as a short circuit, in the electronic circuit. Accordingly, the graphite sheet is sandwiched between first insulating sheet 13 and second insulating sheet 14 which have larger sizes than the graphite sheet. First insulating sheet 13 and second insulating sheet 14 seal the graphite sheet in between outside the outer periphery of the graphite sheet. This configuration prevents scatter of the graphite powder and occurrence of the failure of the electronic circuit.

Materials of thermally-conductive sheet 12 other than the graphite sheet that have high thermal conductivities include, e.g. a gold film, a silver film, an aluminum film, and a copper film.

A material used as thermal insulation layer 15 is a sheet having a thickness of about 0.5 mm made of a non-woven fabric of polyethylene terephthalate (hereinafter abbreviated as PET) holding a silica xerogel thereon. The thermal conductivity of thermal insulation layer 15 is about 0.020 W/m·K, which is smaller than the thermal conductivity of air, about 0.026 W/m·K. Since the thermal conductivity of thermal insulation layer 15 is smaller than the thermal conductivity of air, thermal insulation layer 15 of composite sheet 11 has a superior thermal insulation property with a small volume, hence reducing a size of composite sheet 11.

Thermal insulation layer 15 preferably has a thickness change rate equal to or smaller than 10% to a pressure of 100 kPa applied to thermal insulation layer 15. Thermal insulation layer 15 made of a non-woven fabric of PET holding a silica xerogel thereon has a small thickness change rate of about 3% to a pressure of 100 kPa applied thereto. Thermally-conductive layer 15 less reduces the thermal insulation performance even under application of a pressure, so that it has a high reliability.

As described above, since thermal insulation layer 15 includes a non-woven fabric and a xerogel held on the non-woven fabric, thermal insulating layer 15 is superior in thermal insulation property and can maintain preferable thermal insulation property even under a condition that a pressure is applied.

Other materials that can be used as thermal insulation layer 15 may be, e.g. an air layer and a sheet made of foamed urethane, which have low thermal conductivities. In a case where the air layer or a foamed sheet is used as thermally-conductive sheet 15, there is a possibility that the thermally-conductive sheet is pressed under application of a pressure, and its thermal insulation property reduces.

First insulating sheet 13 includes base layer 13a made of an insulating film, and adhesive layer 13b stacked on one surface of base layer 13a. Base layer 13a is a polyethylene terephthalate insulating film having a thickness of about 10 μm. Adhesive layer 13b is made of an acrylic adhesive layer having a thickness of about 10 μm. First insulating sheet 13 is bonded to thermally-conductive sheet 12 and second insulating sheet 14 via adhesive layer 13b.

Second insulating sheet 14 includes base layer 14a made of an insulating film, adhesive layer 14b provided at a first surface 14d of insulating sheet 14 facing thermally-conductive sheet 12, and adhesive layer 14c provided at a second surface 14e of insulating sheet 14 opposite to first surface 14d. Base layer 14a is a polyethylene terephthalate insulating film having a thickness of about 10 μm. Each of adhesive layer 14b and adhesive layer 14c is made of an acrylic adhesive layer having a thickness of about 10 μm. Second insulating sheet 14 is bonded to thermally-conductive sheet 12 and first insulating sheet 13 via adhesive layer 14b.

The acrylic adhesive has a large adhesion force to the graphite sheet. Accordingly, adhesive layer 13b and adhesive layer 14b preferably bond first insulating sheet 13 and second insulating 14 to the graphite sheet, so that a preferable heat transfer property and a preferable mechanical strength can be obtained. Also, it is possible to preferably seal thermal insulation layer 15.

Thermal insulation layer 15 made of the PET non-woven fabric holding silica xerogel thereon has a small adhesion force to the adhesive since silica particles easily exfoliate. Thermal insulation layer 15 sandwiched and sealed between thermally-conductive sheet 12 and first insulating sheet 13 prevents silica particles from scattering out of composite sheet 11. Accordingly, it is possible to prevent a failure caused by scattering of silica particles while maintaining the thermal insulation property. Thermal insulation layer 15 sandwiched and sealed between thermally-conductive sheet 12 and first insulating sheet 13 prevents a displacing of thermal insulation layer 15.

Adhesive layer 14c is provided on second surface 14e of second insulating sheet 14 exposed from composite sheet 11. Composite sheet 11 having adhesive layer 14c improves the working efficiency at the time of adhering composite sheet 11 to an external device (not shown). Also, by adhering composite sheet 11 to the external device (not shown) through adhesive layer 14c, it is possible to reduce the thermal resistance between composite sheet 11 and the external device (not shown), so that the thermal conduction property can be improved.

Composite sheet 11 has thermal insulation surface 31 at which thermally-conductive sheet 12 is covered with thermal insulation layer 15 and thermally-conductive surface 32 at which thermally-conductive sheet 12 is not covered with thermal insulation layer 15. Composite sheet 11 has superior thermal insulation property for an object contacting thermal insulation surface 31 and has superior thermal conduction property for an object contacting thermally-conductive surface 32. Composite sheet 11 which is a single member that has both a thermal insulation function and a thermal conduction function can be used for the electronic device which requires both thermal insulation and heat dissipation to contribute to reducing the size of the electronic device.

Composite sheet 11 has thermally-conductive region 33 in which first insulating sheet 13, thermally-conductive sheet 12 and second insulating sheet 14 are laminated and thermal insulation layer 15 is not laminated. In thermally-conductive region 33, composite sheet 11 has thermally-conductive surfaces 32 at both the first insulating sheet 13 and the second insulating sheet 14. Composite sheet 11 has both a superior in-plane thermal conduction property and a superior through-plane thermal conduction property in thermally-conductive region 33, so that it is useful as a thermally-conductive member.

Composite sheet 11 has thermal insulation region 34 in which first insulating sheet 13, thermally-conductive sheet 12, thermal insulation layer 15, and second insulating sheet 14 are stacked. In thermal insulation region 34, composite sheet 11 has thermal insulation surface 31 at which thermally-conductive sheet 12 is covered with thermal insulation layer 15 and thermally-conductive surface 32 at which thermally-conductive sheet 12 is not covered with thermal insulation layer 15.

In thermal insulation region 34, composite sheet 11 has a superior thermal insulation property for an object contacting thermal insulation surface 31 and has a superior thermal conduction property for an object contacting thermally-conductive surface 32. In other words, composite sheet 11 has the functions of both a thermal insulation member and a thermally-conductive member.

Composite sheet 11 which has thermally-conductive region 33 and thermal insulation region 34 allows heat entering through thermally-conductive surface 32 in thermal insulation region 34 to be dissipated from thermally-conductive surface 32 in thermally-conductive region 33. Thermal conduction to thermal insulation surface 31 can be suppressed. Accordingly, composite sheet 11 has both a superior thermally-insulative property and a superior thermally-conductive property.

Since thermally-conductive sheet 12 in thermally-conductive region 33 and thermally-conductive sheet 12 in thermal insulation region 34 are constructed by a single thermally-conductive sheet, composite sheet 11 has a superior heat transfer property for transferring heat entering through thermally-conductive surface 32 in thermal insulation region 34 to thermally-conductive surface 32 in thermally-conductive region 33.

The graphite sheet has an anisotropic thermal conduction property in which the in-plane thermal conductivity is higher than the through-plane thermal conductivity. The graphite sheet used as thermally-conductive sheet 12 allows composite sheet 11 to transfer heat entering through thermally-conductive surface 32 in thermal insulation region 34 to thermally-conductive surface 32 in thermally-conductive region 33 to increase the thermal insulation effect on thermal insulation surface 31.

Figure 2C:
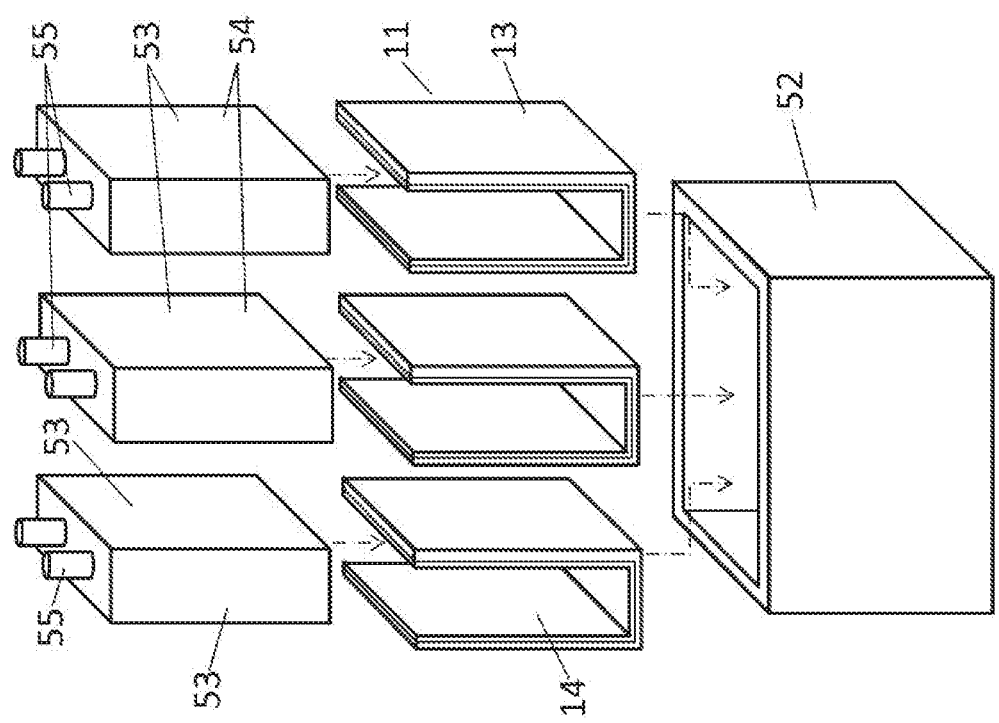
FIG. 2C is an exploded perspective view of the battery pack shown in FIG. 2A.

A battery pack including the composite sheet in accordance with the exemplary embodiment will be described below. FIG. 2A is a sectional view of battery pack 51 including composite sheet 11 in accordance with the exemplary embodiment. FIG. 2B is a sectional view of composite sheet 11 used to construct battery pack 51 shown in FIG. 2A. FIG. 2C is an exploded perspective view of battery pack 51 shown in FIG. 2A.

Battery pack 51 includes case 52 made of a metal, plural battery cells 53 disposed inside the case 52, and composite sheet 11 bonded to outer surface 54 of each of battery cells 53. Each battery cell 53 is a square lithium ion battery having a pair of terminal electrodes 55 disposed on its upper surface. An internal structure of each battery cell 53 is omitted in the sectional view. Thermally-conductive sheet 12 is made of a graphite sheet having a thickness of about 50 μm. Thermal insulation layer 15 is made of a non-woven fabric holding a silica xerogel thereon, and has a thickness of about 0.5 mm. Thermal insulation layer 15 is stacked on at least a part of thermally-conductive sheet 12 so as not to expand out of thermally-conductive sheet 12. Thermally-conductive sheet 12 and thermal insulation layer 15 are sandwiched and sealed between first insulating sheet 13 and second insulating sheet 14.

Composite sheet 11 is bonded to battery cell 53 to cover from one side surface through bottom surface to another side surface of battery cell 53. Composite sheet 11 is bonded such that second insulating sheet 14 contacts outer surface 54 of battery cell 53. In other words, the surface of composite sheet 11 bonded to battery cell 53 is thermally-conductive surface 32 at which thermally-conductive sheet 12 is not covered with thermal insulation layer 15. This configuration allows heat generated by battery cell 53 to be rapidly transferred to thermally-conductive sheet 12, thereby decreasing the temperature distribution inside battery cell 53.

Thermal insulation layer 15 is disposed between battery cell 53 to which composite sheet 12 is bonded and adjacent another battery cell 53. In other words, composite sheet 11 is bonded to battery cell 53 such that thermal insulation surface 31 at which thermally-conductive sheet 12 is covered with thermal insulation layer 15 faces the adjacent another battery cell 53.

In this configuration, even in a case where the temperature of one battery cell 53 in battery pack 51 rises excessively, thermal insulation layer 15 suppresses heat transfer to adjacent another battery cell 53, and suppresses chain generation of excessive temperature rise.

As described above, battery pack 51 can reduce the temperature difference inside battery cell 53 and suppress temperature rise of entire battery cell 53. Even when one battery cell 53 causes thermal runaway, thermal insulation layer 15 disposed between each battery cell 53 and adjacent another battery cell 53 prevents chain reaction of thermal runaway.

When a secondary battery degrades, encased battery cells often expand. In a case where battery cell 53 expands and applies a pressure to thermal insulation layer 15, the pressure reduces the thermal insulation performance of insulation layer 15 if thermal insulation layer 15 is compressed. If this happens, it is likely that chain heat runaway occurs in battery cell 53, so that safety of the battery pack would be lost. For the safety of battery pack 51, it is preferable that thermal insulation layer 15 is made of a material which has a thickness change rate equal to or smaller than 10% to a pressure of 100 kPa applied thereto.

Composite sheet 11 has thermally-conductive region 33 in which thermal insulation layer 15 is not stacked on thermally-conductive sheet 12. Each battery cell 53 to which composite sheet 11 is bonded is connected to case 52 via thermally-conductive region 33 of composite sheet 11. The battery cell contacts composite sheet 11, and composite sheet 11 contacts case 52. Since heat generated at battery cell 53 can be dissipated via thermally-conductive region 33 to case 52, temperature rise of battery cell 53 can be suppressed, so that degradation of battery cell 53 can be suppressed.

A thermally-conductive material, such as silicone grease, may be provided between composite sheet 11 and case 52. This configuration allows heat of battery cell 53 to be more efficiently transferred to case 52.

Composite sheet 11 can provide battery pack 51 having high safety and low degradation.

Device 71 including composite sheet 75 in accordance with another exemplary embodiment will be described below.

FIG. 3 is a sectional view of device 71 including composite sheet 75 in accordance with another exemplary embodiment. In accordance with the present exemplary embodiment, device 71 includes composite sheet 75, heat generating component 72, heatsink 73, and component 74 requiring thermal insulation.

Heat generating component 72 is a component that generates heat when device 71 operates. Heatsink 73 is a member that can dissipate heat generated inside device 71 to the outside. Component 74 requiring thermal insulation is a component which requires suppression of heat transfer to component 74 from heat generating component 72.

Components of composite sheet 75 that are common to those in composite sheet 11 in accordance with the above exemplary embodiment are indicated by like reference marks, and explanation on them will be omitted. Composite sheet 75 in accordance with the present exemplary embodiment is different from composite sheet 11 in accordance with the above-described exemplary embodiment in that thermal insulation layer 15 covers substantially entirely one surface of thermally-conductive sheet 12.

Component 74 requiring thermal insulation is disposed on the thermal insulation layer 15 of composite sheet 75. Heat generating component 72 and heatsink 73 are disposed on the thermally-conductive layer 12 of composite sheet 75. Composite sheet 75 and heat generating component 72 contact or adhere to each other to allow preferable heat transfer between them. Composite sheet 75 and heatsink 73 contact or adhere to each other to allow preferable heat transfer between them.

Since thermal insulation layer 15 of composite sheet 75 covers substantially entirely one surface of thermally-conductive sheet 12, device 71 has a superior thermal insulation property even in a case where component 74 requiring thermal insulation has an area equal to the area of thermally-conductive sheet 12.

Device 71 allows heat dissipation from heat generating component 72 to heatsink 73 even in the case where both heat generating component 72 and heatsink 73 are disposed on the thermally-conductive sheet 12 laminated side of composite sheet 75.

INDUSTRIAL APPLICABILITY

A composite sheet according to the present disclosure has both a thermally high conductive region and a thermally low conductive region, so that it is industrially useful as a thermally-conductive member or a thermal insulation member.

A battery pack according to the present disclosure has a preferable heat dissipation property, and can reduce locally excessive temperature rise, so that it is industrially useful as a power source for various electronic equipment.

REFERENCE MARKS IN THE DRAWINGS 11 composite sheet
12 thermally-conductive sheet
12a, 12b surface
13 first insulating sheet
13a base layer
13b adhesive layer
14 second insulating sheet
14a base layer
14b adhesive layer
14c adhesive layer
14d first surface
14e second surface
15 thermal insulation layer
31 thermal insulation surface
32 thermally-conductive surface
33 thermally-conductive region
34 thermal insulation region
51 battery pack
52 case
53 battery cell
54 outer surface
55 terminal electrode
71 device
72 heat generating component
73 heatsink
74 component
75 composite sheet

The invention claimed is:

1. A composite sheet comprising:
a thermally-conductive sheet; wherein said thermally-conductive sheet is a graphite sheet
a first insulating sheet that covers one surface of the thermally-conductive sheet;
a second insulating sheet that covers another surface of the thermally-conductive sheet, and seals the thermally-conductive sheet between the first insulating sheet and the second insulating sheet; and
a thermal insulation layer that is laminated between the thermally-conductive sheet and the first insulating sheet, the thermal insulation layer covering a part of the thermally-conductive sheet,
wherein the thermally-conductive sheet has a first surface and a second surface opposite to the first surface, and
wherein the first surface of the thermally-conductive sheet includes:
a thermal insulation region in which the thermal insulation layer is stacked on the first surface of the thermally-conductive sheet; and
a thermally-conductive region in which the thermal insulation layer is not stacked on the first surface of the thermally-conductive sheet.

2. The composite sheet according to claim 1, wherein the thermal insulation layer has a thickness change rate equal to or smaller than 10% under a pressure of 100 kPa applied thereto.

3. The composite sheet according to claim 1, wherein the thermal insulation layer has a thermal conductivity which is smaller than a thermal conductivity of air.

4. The composite sheet according to claim 1, wherein the thermal insulation layer includes:
a non-woven fabric; and
a xerogel held on the non-woven fabric.

5. The composite sheet according to claim 1, wherein the second insulating sheet includes an adhesive layer provided at a second surface of the second insulating sheet which is opposite to a first surface of the second insulating sheet facing the thermally-conductive sheet.

6. A battery pack comprising:
a case;
a first battery cell disposed inside the case;
a second battery cell that is disposed inside the case and is adjacent to the first battery cell; and
the composite sheet according to claim 1 bonded to an outer surface of the first battery cell,
wherein the second insulating sheet of the composite sheet contacts the outer surface of the first battery cell, and
wherein the thermal insulation layer is disposed between the first battery cell and the second battery cell.

7. The composite sheet according to claim 1, wherein the first insulating sheet and the second insulating sheet have a larger size than thermally-conductive sheet, and are bonded to each other outside an entire of an outer periphery of the thermally-conductive sheet to entirely seal the thermally-conductive sheet and the thermal insulation layer.

8. The battery pack according to claim 6,
wherein the first battery cell has a first surface and a second surface opposite to the first surface of the first battery cell, and
wherein the composite sheet is folded such that:
the first surface of the first battery cell faces the thermal insulation region of the thermally-conductive sheet across the second insulating sheet; and
the second surface of the first battery cell faces the thermally-conductive region of the thermally-conductive sheet across the second insulating sheet.

9. The battery pack according to claim 6, wherein the first surface of the first battery cell and the second surface of the first battery cell contact the second insulating sheet.

10. The battery pack according to claim 6, wherein the first insulating sheet and the second insulating sheet have a larger size than thermally-conductive sheet, and are bonded to each other outside an entire of an outer periphery of the thermally-conductive sheet to entirely seal the thermally-conductive sheet and the thermal insulation layer.

11. The composite sheet according to claim 1, wherein the thermal insulation region extends at least one-third of a length of the first surface of the thermally-conductive sheet.

* * * * *